United States Patent
Murdoch et al.

(10) Patent No.: US 11,330,800 B2
(45) Date of Patent: May 17, 2022

(54) METHODS FOR STABILITY ENHANCEMENT FOR RECREATIONAL ANIMALS

(71) Applicant: The Murdoch Method, LLC, Washington, VA (US)

(72) Inventors: Wendy Murdoch, Washington, VA (US); Bradley Schneider, Washington, VA (US)

(73) Assignee: THE MURDOCH METHOD, LLC, Washington, VA (US)

( * ) Notice: Subject to any disclaimer, the term of this patent is extended or adjusted under 35 U.S.C. 154(b) by 196 days.

(21) Appl. No.: 16/720,427

(22) Filed: Dec. 19, 2019

(65) Prior Publication Data
US 2020/0120898 A1 Apr. 23, 2020

Related U.S. Application Data

(62) Division of application No. 15/280,012, filed on Sep. 29, 2016, now abandoned.

(51) Int. Cl.
*A01K 15/02* (2006.01)
*G01L 5/00* (2006.01)

(52) U.S. Cl.
CPC .......... *A01K 15/02* (2013.01); *A01K 15/027* (2013.01); *G01L 5/00* (2013.01)

(58) Field of Classification Search
CPC .... A01K 13/007; A01K 15/02; A01K 15/027; A01K 29/00; A01K 29/005; A01L 11/00; A43D 1/022; G01L 5/00
USPC .... 54/82; 119/753, 754, 755, 756, 757, 816; 462/1
See application file for complete search history.

(56) References Cited

U.S. PATENT DOCUMENTS

| | | | |
|---|---|---|---|
| 2,547,419 | A | 4/1951 | Sugarman et al. |
| 2,955,326 | A | 10/1960 | Murray |
| 3,320,347 | A | 5/1967 | Greenawalt |
| 4,095,561 | A | 6/1978 | Ruetenik |
| 5,027,461 | A | 7/1991 | Cumberland |
| 5,224,549 | A | 7/1993 | Lightner |
| 8,220,231 | B2 | 7/2012 | Ruetenik |
| D675,267 | S | 1/2013 | Jamison |
| 8,414,414 | B2 | 4/2013 | Viramontez |
| 8,834,141 | B2 | 9/2014 | Cooke et al. |

(Continued)

OTHER PUBLICATIONS

W. Murdoch, "Introducing the Official SURE FOOT® Equine Stability Program Pads", Oct. 30, 2017, pp. 1-7.

(Continued)

*Primary Examiner* — Brady W Frazier
(74) *Attorney, Agent, or Firm* — Finnegan, Henderson, Farabow, Garrett & Dunner, LLP

(57) ABSTRACT

An apparatus for improving stability of a recreational animal may comprise a stability enhancement component. The stability enhancement component may comprise a top component, a bottom component, and four side components and may be rectangularly shaped. The stability enhancement component may comprise a diffuse surface that is configured to absorb the pressure the recreational animal exerts and spread the exerted pressure firmly throughout the rest of the stability enhancement component. The stability enhancement component may further comprise a direct surface that is configured to exert pressure in a direction opposite of a direction in which pressure is exerted by the recreational animal.

13 Claims, 4 Drawing Sheets

(56) References Cited

U.S. PATENT DOCUMENTS

| | | |
|---|---|---|
| 2005/0101444 A1 | 5/2005 | Dadbeh |
| 2006/0183520 A1 | 8/2006 | Champion |
| 2006/0287171 A1 | 12/2006 | Gerstung |
| 2007/0087902 A1 | 4/2007 | Penat et al. |
| 2009/0036811 A1 | 2/2009 | Lidtke et al. |
| 2011/0197554 A1 | 8/2011 | Ruetenik |
| 2011/0256987 A1 | 10/2011 | Lepore |
| 2012/0316044 A1 | 12/2012 | Matsuno |
| 2013/0000045 A1 | 1/2013 | Losio |
| 2014/0104395 A1 | 4/2014 | Rohaly |
| 2014/0325763 A1 | 11/2014 | Mason |
| 2017/0099825 A1 | 4/2017 | Ruetenik |

OTHER PUBLICATIONS

PCT Search Report and Written Opinion of the International Searching Authority in International Application No. PCT/US2017/053444, dated Nov. 7, 2017.

PCT Notification Concerning Transmittal of International Preliminary Report on Patentability (Chapter 1 of the Patent Cooperation Treaty), PCT No. PCT/US2017/053444, dated Apr. 11, 2019, 6 pp.

METHODS FOR STABILITY ENHANCEMENT FOR RECREATIONAL ANIMALS

This is a division of application Ser. No. 15/280,012, filed Sep. 29, 2016, all of which is incorporated herein by reference.

TECHNICAL FIELD

This disclosure relates generally to stability improving systems and methods, including related apparatuses. More specifically, this disclosure relates to systems and methods for improving stability for recreational animals.

BACKGROUND

Animals suffer stability deficiencies for a variety of reasons. For example, how an equestrian uses and cares for a horse can have a significant impact on the horse's natural ability to stand. Even factors as marginal as riding position have shown to detrimentally affect a horse's stability. Further, animals are sometimes used in sport or other burdening manners causing significant stress on their bodies, and in particular, their ligaments.

Today, products targeting stability enhancement exist. However, these products are targeted towards humans and are difficult to adapt for many recreational animals. Existing stability products lack durability to sustain a large animal, such as a horse. For example, the TheraBand® stability trainer provides foam, oval-shaped pads in various densities that attempt to create unsteady surface challenges to improve stability and balance through training and exercise. Even though these stability trainer pads are large enough for an animal, such as a horse, to place a foot upon, the pads lack long-term durability when used for heavier animals. For example, a horse's sharp edged hoofs tend to tear apart the stability products, sometimes even on the first use. Due to these issues, horse trainers are limited to TheraBand® stability pads at certain densities that can withstand the weight of a horse and the sharpness of the hoofs. Horse trainers may also be forced to use these pads only when the horse wears a boot, but this drastically reduces the impact of the stability training.

Therefore, it can be infeasible and ineffective to continue to use these products. Thus, there is a need in the art for a stability product that can sustain heavy recreational animals and still provide the natural benefits of stability products.

The present disclosure is directed toward a non-existing technology for improving the stability of recreational animals.

SUMMARY

In an exemplary embodiment, the present disclosure is directed to an apparatus for improving stability of a recreational animal that includes a stability enhancement component. For the purpose of this disclosure, a recreational animal may include, but is not limited to, any of a horse, donkey, mule, reindeer, camel, or giraffe. The stability enhancement component may be rectangular shaped and may include a top component, a bottom component, and a plurality of side components. The stability enhancement component may be configured to hold an entire foot of the recreational animal (e.g., a horse's hoof). The stability enhancement component may include a top working surface and a bottom working surface. In some embodiments, the stability enhancement component may have a uniform density throughout. For example, the top working surface and the bottom working surface would have the same density. The density may range from 1.5 to 7.3 pounds per cubic foot. In other embodiments, the stability enhancement component may not have a uniform density. For example, the top working surface may comprise material having one density value and a bottom working surface comprising material having a second density value. In some embodiments, the first and second density values may be the same while the embodiments are of different materials. In other embodiments, the first and second density values may be different. The two surfaces are then bonded together using conventional lamination techniques and industrial adhesives and sent through a device to apply pressure to ensure complete and uniform contact between the materials during the bonding process.

In one embodiment, the top working surface of the stability enhancement component includes the diffuse surface and the bottom working surface of the stability enhancement component includes the direct surface. In some examples, the recreational animal exerts pressure onto the diffuse surface and the diffuse surface may be configured to absorb the pressure and spread the exerted pressure firmly throughout the stability enhancement component. In some examples, the diffuse surface equally distributes the pressure exerted upon it perpendicularly outward from the point where the pressure is exerted upon and around the part of the recreational animal exerting the pressure, e.g., the recreational animal's foot or hoof. For example, if a horse's hoof exerts even pressure vertically onto the diffuse surface, the diffuse surface absorbs the pressure and provides an even support back into the horse's hoof. The equal distribution of the pressure may impose a level of suspension on the object exerting pressure. For example, a horse's hoof would not sink deep into the diffuse surface, but rather create a suspension type relationship with the diffuse surface, making the horse feel unstable and requiring the horse to adjust its balance accordingly. The amount of instability may be directly related to the weight of the object and the amount of pressure exerted on to the diffuse surface. Additionally, if the recreational animal exerts uneven pressure, i.e., more to the toe, heel, or side of the foot or hoof, then a level of suspension will be imposed on the portions of the recreational animal's foot or hoof that exert less pressure than the critical point of the foot or hoof. For example, the critical point of the foot or hoof may be the point which exerts the most pressure onto the stability enhancement component. In some embodiments, the stability enhancement component may still provide sufficient support to the recreational animal's foot or hoof to allow the recreational animal to stand, even when the recreational animal exerts uneven pressure onto the stability enhancement component.

In another embodiment, the top working surface of the stability enhancement component includes the direct surface and the bottom working surface of the stability enhancement component includes the diffuse surface. In some embodiments, the recreational animal exerts pressure onto the direct surface and the direct surface may be configured to absorb the pressure. In some embodiments, the direct surface responds to the pressure exerted by the recreational animal by exerting pressure in the opposite direction. The pressure exerted between the direct surface and the recreational animal may create a compression shape, wherein the direct surface is compressed in the shape of the object exerting pressure onto it. For example, a horse's hoof may exert pressure onto and sink into the direct surface, wherein the direct surface is compressed downwardly in the shape of the horse's hoof. In some embodiments, the diffuse surface sinks unevenly based on the amount of pressure exerted at various locations on the diffuse surface. For example, the front of a horse's hoof may exert more pressure onto the diffuse surface than the back of the horse's hoof and, therefore, the location where the front of the horse's hoof exerts pressure will sink lower than the location where the back of the horse's hoof exerts pressure. The point where the diffuse surface sinks the most may be a balance point for the recreational animal. The point where the diffuse surface sinks the most may also correspond to the location where the most pressure is exerted by the recreational animal onto the diffuse surface.

In another embodiment, the top working surface of the stability enhancement component includes the diffuse surface and the bottom working surface of the stability enhancement component includes a neutral surface. In this configuration the material has a high density and a slow compression response characteristic to the placement of weight on the neutral surface. This slow response allows the horse to perceive the material to be similar to solid ground, thus creating a neutral response by the recreational animal initially. As the recreational animal stands on the neutral surface the material slowly compresses and the time window is longer thus allowing the horse to achieve a comfort with the surface and not be as reactionary to the change of support or unsteadiness underneath the hoof. The recreational animal may exert pressure onto the diffuse surface and the diffuse surface may be configured to absorb the pressure. In some embodiments, the bottom working surface, that surface which does not have a color keyed coating and which is the same color as the primary material, may be configured to gradually yield to the exerted pressure and compress downward. The amount of downward compression may be directly related to the amount of weight of the recreational animal. After a predetermined amount of time, an impression of the object exerting pressure onto the stability enhancement component (e.g., a horse's hoof) may be created on the stability enhancement component. The impression may last on the stability enhancement component for a certain time interval. For example, a horse's hoof may exert pressure onto the stability enhancement component and create an impression of the hoof that can be analyzed or touched after the horse steps off. The impression created may indicate a loading characteristic of the recreational animal.

In some embodiments, the bottom working surface provides structural integrity for the top working surface to improve efficiency of the functionalities of the top working surface. For example, if the stability enhancement component is placed on a sand surface, then the bottom working surface creates a firm surface permitting the top working surface to withstand the immense pressure placed on the top working surface by the recreational animal. The interactions between the ground, the top working surface, and the bottom working surface allow the stability enhancement component to be used in numerous environments. For example, the stability enhancement component can be placed on a variety of surfaces without sacrificing efficiency.

In another exemplary embodiment, the stability enhancement component comprises a slanted top component configured to allow the recreational animal to stand on a slant and a wedge side component that is higher than the directly opposite side component. In some examples, the stability enhancement component may be cut on a 14° angle from the front of the narrow side component to the rear of the component generating a wedge shape. In other embodiments, the top component includes a diffuse surface and the bottom component includes a direct surface. In other embodiments, the top component includes a direct surface and the bottom component includes a diffuse surface. In some examples, the slanted top component may be placed in various positions for different results. For example, the slanted top component may be placed facing the front of a recreational animal, and the recreational animal's heel, which is the back portion of the recreational animal's foot or hoof, would be in a high position when the recreational animal's hoof is on the stability enhancement component. In another example, the slanted top component may be placed facing the back of a recreational animal, and the recreational animal's heel would be in a low position when the recreational animal's foot or hoof is on the stability enhancement component.

In another embodiment, the stability enhancement component may be configured to absorb the pressure exerted by the recreational animal and apply resistance in the opposite direction of the exerted pressure to create a level of instability for the recreational animal. The amount of resistance the stability enhancement component applies depends on a variety of factors including, but not limited to, the density of the stability enhancement component, the weight of the recreational animal, and the configuration of the stability enhancement component. For example, the configuration of the stability enhancement component may include the top working surface of the stability enhancement component comprising a diffuse surface. In some examples, the stability enhancement component provides an instable environment to fix any unequal weight distribution issues that may exist. For example, a recreational animal's foot or hoof may be exerting pressure on the stability enhancement component unevenly, causing extreme pressure on the portion of the foot or hoof applying the pressure. The stability enhancement component may assist in causing the recreational animal's foot or hoof to exert pressure uniformly throughout the entire foot or hoof. In another example, a recreational animal may have two of its feet or hoofs placed onto two stability enhancement components and may exert pressure unevenly across the two feet or hoofs. The stability enhancement components may assist in causing the recreational animal's feet or hoofs to exert pressure equally on each stability enhancement component.

In another exemplary embodiment, the present disclosure is directed to a method of improving a recreational animal's stability by setting up a stability enhancement environment. The stability enhancement environment may include at least one first stability enhancement component placed adjacent to at least one recreational animal foot. The recreational animal may be guided onto at least one first stability enhancement component for a first predetermined time interval. For example, a trainer may guide a horse to place one of its hoofs onto a stability enhancement component or place two of its hoofs onto two separate stability enhancement components. In some embodiments, the stability enhancement component may be configured to absorb the pressure exerted by the recreational animal and create an impression onto the stability enhancement component of the object exerting the pressure (e.g. a horse's hoof). The impression left on the stability enhancement component may indicate loading characteristics, including, but not limited to, whether the recreational animal is unevenly exerting pressure onto the stability enhancement component. For example, the impression will be deeper on the front end of the stability enhancement component if the horse is placing more weight on the front end of its hoof when it tries to balance itself on the stability enhancement component.

In some embodiments, the stability enhancement environment may be analyzed based on a set of factors relating to observations of the recreational animal on the at least one first stability enhancement component. For example, a trainer may observe relaxation factors. Relaxation factors may include a recreational animal taking deeper breaths, blowing through its nose, licking and chewing, and lowering its head. In another example, a trainer may determine how long a recreational animal stays on a stability enhancement component. For example, a trainer may determine that a recreational animal stayed on a stability enhancement component longer than a predetermined time. In other examples, a trainer may compare what occurs at the stability enhancement environment with what has occurred during previous uses of stability enhancement environments.

In some embodiments, the stability enhancement environment may be adjusted if necessary, based on analyzing the stability enhancement environment. For example, if a recreational animal stayed on one stability enhancement component for longer than a predetermined period of time, then the trainer may increase the number of stability enhancement components in the stability enhancement environment. In one exemplary embodiment, the adjustment of the stability enhancement environment may comprise interchanging of at least one of the first stability enhancement component with a second stability enhancement component, increasing the number of at least one first stability enhancement component, decreasing the number of at least one first stability enhancement component, relocating the at least one first stability enhancement component, repositioning the at least one first stability enhancement component to a different recreational animal foot or hoof, increasing the first predetermined time interval, or decreasing the first predetermined time interval. In another exemplary embodiment, the setting up a stability enhancement environment further comprises positioning a recreational animal foot or hoof onto an impression stability enhancement component for a second predetermined time interval to create an impression of a recreational animal foot or hoof. The impression of a recreational animal foot or hoof may be analyzed to determine a type of the first stability enhancement component to use. The analysis of the impression may include determining the recreational animal's natural ability to stand. In another exemplary embodiment, the setting up of a stability enhancement environment may include determining a number of the at least one first stability enhancement components to place in front of the same number of recreational animal feet and deciding how many of each type of first stability enhancement components to place. The first stability enhancement component may comprise a firm stability enhancement component, a medium stability enhancement component, or a soft stability enhancement component. In another exemplary embodiment, the analyzing of a set of factors relating to observations of the stance of the recreational animal may comprise observing breathing signs of the recreational animal, comparing the recreational animal's past performances with a current performance, taking into consideration the issue or injury being treated, and checking a list of goals. In another exemplary embodiment, determining whether adjustment of the stability enhancement environment is needed may comprise concluding whether to increase or decrease the difficulty of the stability enhancement environment.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items.

As used in this application and in the claims, the singular forms "a," "an," and "the" include the plural forms unless the context clearly dictates otherwise. Additionally, the term "includes" means "comprises," Further, the term "coupled" does not exclude the presence of intermediate elements between the coupled items.

The systems and methods described herein should not be construed as limiting in any way. Instead, the present disclosure is directed toward all novel and non-obvious features and aspects of the various disclosed embodiments, alone and in various combinations and sub-combinations with one another. The disclosed systems and methods are not limited to any specific aspect or feature or combinations thereof, nor do the disclosed systems and methods require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description may use terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. Reference will now be made in detail to the drawings.

Figure 1A:
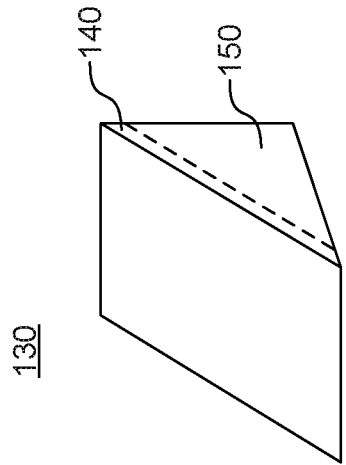
FIGS. 1A and 1B illustrate exemplary stability enhancement components, consistent with disclosed embodiments.

FIG. 1A illustrates exemplary stability enhancement component 100 used to help a recreational animal improve its stability. FIG. 1A includes a side view of the stability enhancement component 100 having a diffuse surface 110 and a direct surface 120. In some embodiments, the stability enhancement component is 10" by 12". In some embodiments, the diffuse surface 110 may include a high wear-resistant coating. In some examples, the high-resistance coating may include a combination of plastic and flex resins. The high-resistance coating may provide tear resistance and increase the durability and lifespan of the stability enhancement component 100. The high-resistance coating may also be highly flexible to withstand deformation when significant pressure is exerted upon it (e.g. a horse steps on). For example, the high-resistance coating may be resistant to cuts and tears when it is bent, stretched, or otherwise deformed. In some examples, the high-resistance coating may be colored. The color of the high-resistance coating is a color code to indicate the density of stability enhancement component 100. In other embodiments, the direct surface 120 may be uncoated.

In practice, when the recreational animal steps on the diffuse surface 110, the diffuse surface 110 may absorb any applied pressure and spread the pressure outwardly throughout the stability enhancement component 100. If the recreational animal applies pressure evenly onto the stability enhancement component 100, then the stability enhancement component 100 will create a suspension type relationship with the recreational animal's entire foot or hoof. If the recreational animal applies pressure unevenly onto the stability enhancement component 100, then the stability enhancement component 100 will create a suspension type relationship with the recreational animal at a critical point where the recreational animal exerts the most pressure onto the stability enhancement component 100. In another embodiment, when the recreational animal steps on the direct surface, the direct surface 120 may absorb any applied pressure directly at the location where the pressure was applied on the stability enhancement component 100, allowing the stability enhancement component 100 to compress downward and around the pressure applying object, for example, a foot of a recreational animal. As the stability enhancement component 100 is compressed, it simultaneously exerts pressure in the opposite direction of the pressure applying object. A recreational animal may unevenly exert pressure onto stability enhancement component 100, creating a balance point at the location where the recreational animal exerts the most pressure.

The stability enhancement component 100 may vary in densities to provide various levels of instability for the object applying pressure. In one embodiment, the stability enhancement component 100 may comprise a low-density. For example, the stability enhancement component 100 may comprise a density, in the range of 1.5 to 2.5 pounds per cubic foot, material. The stability enhancement component 100 may provide high instability for the object applying pressure. For example, the stability enhancement component 100 may provide low resistance when an object applies pressure and force the object to sink into the stability enhancement component 100. The stability enhancement component 100 may create a greater range of motion for the object as compared to when the object applies pressure to a firm ground surface (e.g. cement sidewalk) and require the object to stabilize itself.

In another embodiment, the stability enhancement component 100 may comprise a high-density. For example, the stability enhancement component 100 may comprise a density, in the range of 3.0 to 4.5 pounds per cubic foot. The stability enhancement component 100 may provide firm stability for the object applying the pressure. For example, when an object applies pressure onto it, the stability enhancement component 100 may provide strong resistance and a firm surface to stand on. Compared to the low-density stability enhancement component 100, the object applying pressure does not have as extensive range of motion. The resistance provided by the stability enhancement component 100 may immediately occur. For example, when the object applies pressure, the stability enhancement component immediately begins resisting against the pressure and an equilibrium between the stability enhancement component and the object applying pressure is quickly reached.

In other embodiments, the stability enhancement component 100 may comprise a medium-density. For example, the stability enhancement component 100 may comprise a density, in the range of 8.0 to 9.5 pounds per cubic foot. The stability enhancement component 100 provides an increasingly unstable stability enhancement component 100 as the density is decreased. In some embodiments, diffuse surface 110 and direct surface 120 may not have uniform densities. In other examples, diffuse surface 110 and direct surface 120 may comprise different materials.

Figure 1B:
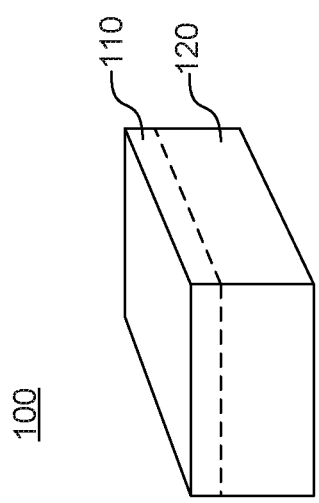

FIG. 1B illustrates another exemplary stability enhancement component 130. The stability enhancement component 130 may comprise a diffuse surface 140 and a direct surface 150, with functionalities and characteristics similar to diffuse surface 110 and a direct surface 120, as described in exemplary stability enhancement component 100, depicted in FIG. 1A. The stability enhancement component 130 may also be cut on an angle to allow an object applying pressure to apply pressure in either an upward slanted position or a downward slanted position. For example, a trainer may use stability enhancement component 130 with a horse's rear legs and position the horse to have its heel higher than its toe. The stability enhancement component 130 may enhance a recreational animal's ability to move. For example, a trainer may utilize the stability enhancement component 130 to help adjust the angles between a horse's hind limb joints and, as a result, improve the horse's ability to move stronger and faster. Specifically, the angle between a horse's stifle and hock may be adjusted to allow improved flexibility while striding.

Figure 2A:
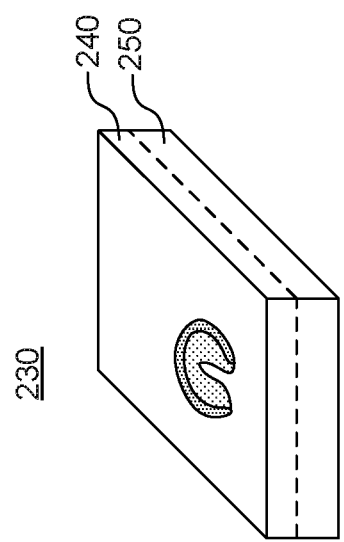
FIGS. 2A and 2B illustrate exemplary stability enhancement components, consistent with disclosed embodiments.
Figure 2B:
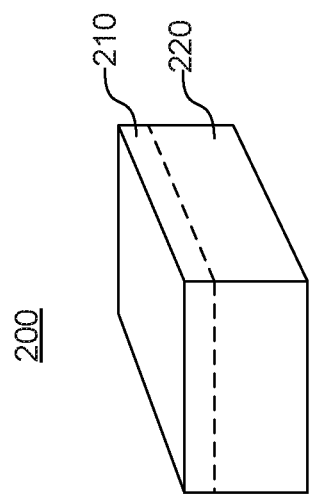

FIG. 2A illustrates another exemplary stability enhancement component 200. FIG. 2A includes a side view of the stability enhancement component 200 having a diffuse surface 210 and a neutral surface 220. The diffuse surface 210 may be equivalent to the diffuse surface 110 described in FIG. 1. The neutral surface 220 may have a density ranging from 5.8 to 7.3 pounds per cubic foot. FIG. 2B illustrates another exemplary stability enhancement component 230, which is equivalent to the stability enhancement component 200 as described in FIG. 2A. Stability enhancement component 230 includes a diffuse surface 240 and neutral surface 250 that may be equivalent to the diffuse surface 210 and a neutral surface 220 described in FIG. 2B. In one embodiment, the stability enhancement component 230 slowly yields to an object that is applying weight onto the stability enhancement component 230. For example, the resistance provided by the stability enhancement component 230 occurs slowly and, therefore, an equilibrium between the stability enhancement component 230 and the object applying pressure is not reached for some time. The stability enhancement component 230 may be left with an impression of the object applying the weight as shown in stability enhancement component 230 indicating how the recreational animal contacts a structure (e.g. ground, stability enchantment component). The impression may be indicative of loading characteristics, including, but not limited to, how the object is applying pressure onto the stability enhancing component based on the varying depth levels throughout the impression. For example, the object applying pressure may be a horse's hoof and the impression left may indicate the level of pressure being applied by the various parts of a horse's hoof.

In some embodiments, examination of the impression may allow an individual to understand the loading characteristics of the recreational animal. For example, for a horse, an impression with unequal depth levels would reveal any unequal side-to-side or front-to-back loading by the horse. Ideally, a horse's hoof should apply pressure onto a structure (e.g. ground, stability enhancement component, etc.) equally throughout the entire hoof and leave a leveled impression on the stability enhancement component 230. Stability enhancement component 230 allows an individual to understand a recreational animal's points of imbalance and helps explain abnormal issues (e.g. a horse's difficulty in making a left turn). Prior to using the stability enhancement component, individuals attempted to visually inspect a horse to determine imbalance issues or unequal loading, but this methodology was not effective.

In other examples, multiple stability enhancement components may be used with recreational animals to reveal more information about the recreational animal. For example, a trainer may use up to four stability enhancement components, one for each horse's hoof and determine more detailed balance issues such as twisting of the spine or other bones.

Figure 3:
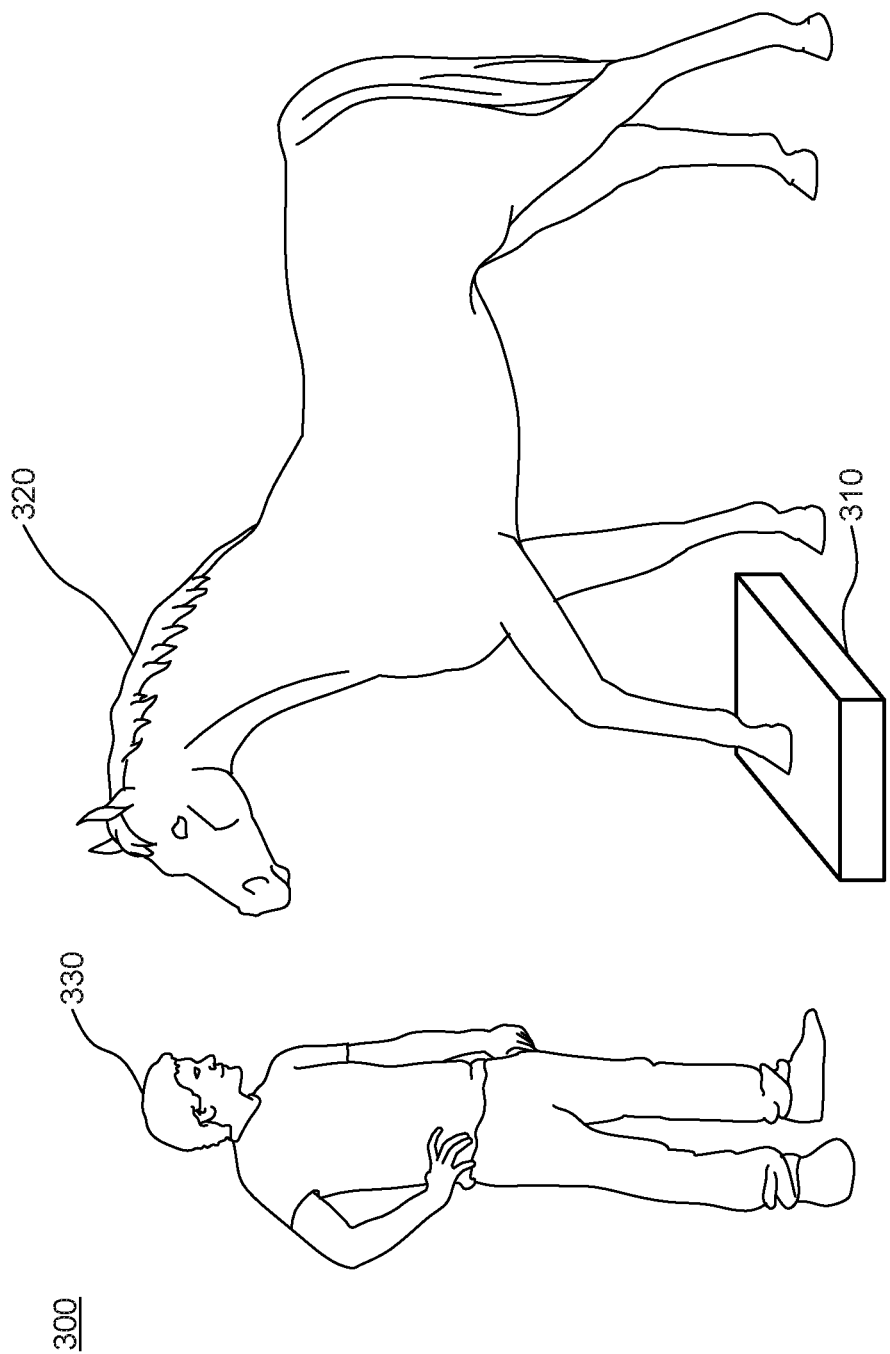
FIG. 3 illustrates an exemplary stability enhancement environment, consistent with disclosed embodiments.

FIG. 3 illustrates an exemplary stability enhancement environment 300 including at least one stability enhancement component 310, a recreational animal 320, and a trainer 330. The stability enhancement environment 300 may be set up by a trainer based on a difficulty desired for a recreational animal. The methods described in FIG. 4 define some examples of how the stability enhancement environment may be utilized.

Figure 4:
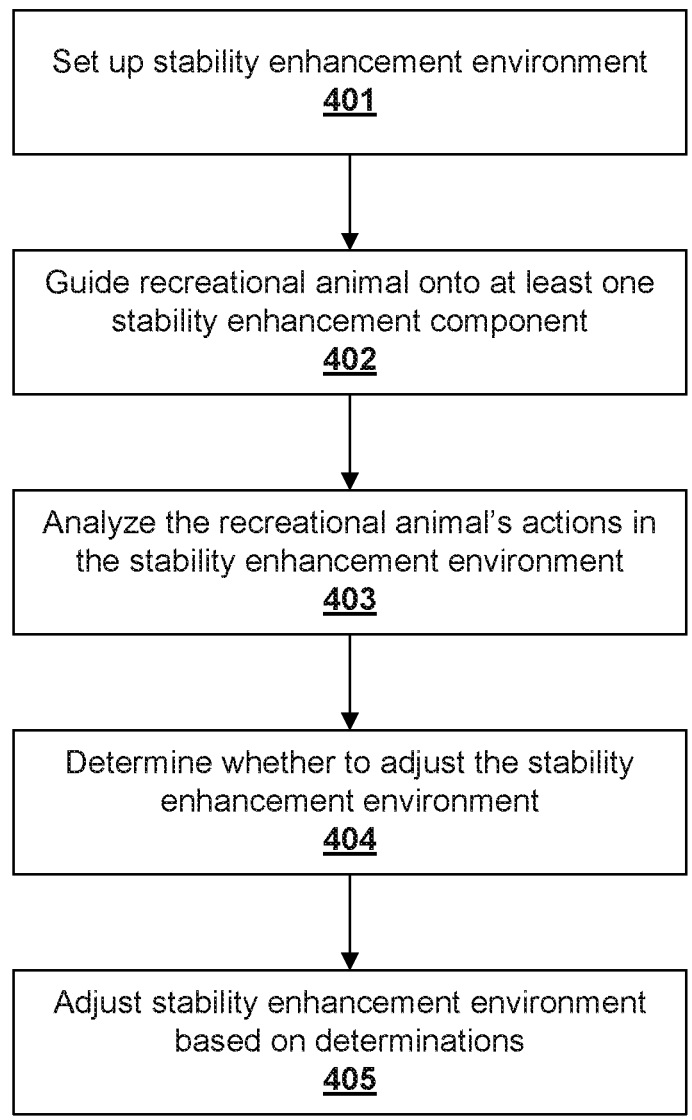
FIG. 4 illustrates a flowchart of an exemplary method for setting up a stability enhancement environment, consistent with disclosed embodiments.

FIG. 4 describes one embodiment that the stability enhancement environment 300 may be used for. At step 401, the stability enhancement environment is set up with at least one stability enhancement component placed adjacent to at least one recreational animal foot. The setting up of the stability enhancement environment may also include having a recreational animal stand on at least one stability enhancement component for a predetermined time interval. The predetermined time interval may be based on the past performance of the recreational animal, injuries suffered by the recreational animal, or a set of goals for the recreational animal. The setting up of the stability enhancement environment may also include analyzing an impression left by the recreational animal onto the stability enhancement component and determining the recreational animal's natural ability to stand. For example, if the recreational animal was a horse, the analysis may include determining how the horse's hoofs make contact with the ground and whether any loading issues exist. Loading issues may include a horse unequally applying pressure across one hoof, unequally applying pressure across all four hooves and unequally applying pressure on one side. Ideally, a horse naturally stands equally throughout all four hooves and throughout each individually hoof itself. This information may help indicate whether the recreational animal is putting stress on internal structures of the foot and help determine corrective trimming and shoeing techniques to implement. Horse trimming and shoeing techniques may include using tools to remove parts of the horse's hoof and level them to an appropriate depth.

The setting up of the stability enhancement environment may also include deciding the number of stability enhancement components to place adjacent to the recreational animal feet. In some embodiments, increasing the number of stability enhancement components in the stability enhancement environment increases the difficulty of the stability enhancement environment. Each additional stability enhancement component increases the instability that a recreational animal feels. The setting up of the stability enhancement environment may also include deciding which type of stability enhancement components to place in the stability enhancement environment. The type of stability enhancement components may vary in terms of the density. For example, a firm stability enhancement component may comprise a material with a low-density, a soft stability enhancement component may comprise a material with high-density and a medium stability enhancement component may comprise a material with a density between the low-density and high-density material. In another embodiment, the type of stability enhancement components may vary in shape. For example, a slanted stability enhancement component, as shown in FIG. 1B. The variations in shape may also add another degree of difficulty to the stability enhancement environment. The setting up of the stability enhancement environment may also include positioning the stability enhancement components. For example, the stability enhancement components may be on more than one hoof, only on front hooves or on hooves diagonally across from each other.

At step 402, the recreational animal is guided onto the at least one stability enhancement component. At step 403, the recreational animal's actions in the stability enhancement environment is analyzed based on a set of factors. The set of factors may include the recreational animal's breathing changes, physical changes, past performance compared to current performance in the stability enhancement environment, and the specific injury or issue being treated and goals set out for the recreational animal. For example, breathing and physical changes may indicate relaxation or decreased pain. Breathing changes may include breathing with eyes partially or fully closed, yawning, deeper breathing, blowing through the nose. Physical changes may include licking and chewing, lowering the head, swaying, and rocking.

At step 404, a trainer determines whether the stability enhancement environment needs to be adjusted based on the analysis performed at step 403. Determining whether to adjust the stability enhancement environment may require determining whether to increase or decrease the difficulty of the stability enhancement environment. In some embodiments, the trainer can increase or decrease the difficulty of the stability enhancement environment by interchanging at least one stability enhancement component with another stability enhancement component, increasing or decreasing the number of stability enhancement components to the stability enhancement environment, relocating the stability enhancement components relative to a recreational animal's first foot, repositioning the stability enhancement components to a second, third, and/or fourth foot, or changing the time interval the first, second, third, and/or fourth feet of the recreational animal are placed onto the stability enhancement components. At step 405, the trainer adjusts the stability enhancement environments based on the determinations at step 404.

The technologies described herein have many advantages in the field of recreational animal stability products. For example, more durable recreational animal stability products may be provided. The stability enhancement components also provide a variety of stability challenges that can accommodate animals specifically to their needs.

The stability enhancement environment can provide insight on an animal's natural standing ability and address a variety of stability issues that can make the animal more comfortable and improve overall balance. For example, an equestrian may utilize a variety of stability enhancement components at successive trainings to gradually improve a horse's ability to stabilize and react to different stability environments. This may act as a relaxation technique for the horse or be used to improve an injury or physical defect. The ability to increase or decrease the stability enhancement environment may allow the environment to be personalized to the specific animal.

The order of execution or performance of the operations in the disclosed embodiments illustrated and described herein is not essential, unless otherwise specified. That is, the operations can be performed in any order, unless otherwise specified, and embodiments can include additional or fewer operations than those disclosed herein. For example, it is contemplated that executing or performing a particular operation before, contemporaneously with, or after another operation is within the scope of aspects of the disclosed embodiments.

Having described the disclosed embodiments in detail, it will be apparent that modifications and variations are possible without departing from the scope of aspects as defined in the appended claims. In addition, the technologies from any embodiment or example can be combined with the technologies described in any one or more of the other embodiments or examples. In view of the many possible embodiments to which the principles of the disclosed technology may be applied, it should be recognized that the illustrated embodiments are examples of the disclosed technology and should not be taken as a limitation on the scope of the disclosed technology. Therefore, it is intended that all matter contained in the above description and shown in the accompanying drawings shall be interpreted as illustrative and not in a limiting sense.

What is claimed is:

1. A method of improving a recreational animal's stability, the method comprising:
    setting up a stability enhancement environment comprising a first stability enhancement component placed adjacent to a recreational animal foot;
    guiding the recreational animal onto the first stability enhancement component for a first predetermined time interval,
    analyzing a set of factors relating to observations of the recreational animal on the first stability enhancement component, the set of factors comprising at least one of a relaxation factor or a comparison with a previous use of a previous stability enhancement environment;
    determining that adjustment of the stability enhancement environment is needed; and
    adjusting the stability enhancement environment.

2. The method of claim 1, wherein the first stability enhancement component is configured to create an impression of the recreational animal foot, and wherein analyzing a set of factors comprises analyzing an impression left by the recreational animal foot on the first stability enhancement component.

3. The method of claim 2, further comprising determining a type of the first stability enhancement component to use subsequently based on analyzing the impression left on the first stability enhancement component.

4. The method of claim 3, wherein analyzing the impression further comprises determining the recreational animal's natural ability to stand.

5. The method of claim 3, further comprising introducing the determined type of first stability enhancement component to the stability enhancement environment.

6. The method of claim 1, wherein setting up a stability enhancement environment further comprises determining a number of the first stability enhancement components to place in front of the same number of recreational animal feet and deciding how many of each type of first stability enhancement components to place.

7. The method of claim 1, wherein setting up a stability enhancement environment further comprises placing a second stability enhancement component adjacent to a different recreational animal foot, said second stability enhancement component being of a different type than the first stability enhancement component.

8. A method of claim 1, wherein analyzing a set of factors relating to observations of the recreational animal on the first stability enhancement component further comprises observing breathing signs of the recreational animal, observing physical signs of the recreational animal, comparing the recreational animal's past performances with a current performance, considering an issue being treated, or checking a list of goals.

9. The method of claim 1, wherein determining that adjustment of the stability enhancement environment is needed further comprises concluding that an increase or a decrease in the difficulty of the stability enhancement environment is needed.

10. The method of claim 1, wherein adjusting the stability enhancement environment comprises guiding the recreational animal onto a second stability enhancement component for a second predetermined time interval.

11. The method of claim 1, wherein adjusting the stability enhancement environment comprises at least one of:
    interchanging first stability enhancement component with a second stability enhancement component,
    adding another stability enhancement component,
    decreasing the number of first stability enhancement components,
    relocating the first stability enhancement component,
    repositioning the first stability enhancement component to a different recreational animal foot,
    increasing the first predetermined time interval, or
    decreasing the first predetermined time interval.

12. The method of claim 1, wherein the first stability enhancement component comprises:
    a top component comprising a diffuse surface, the diffuse surface being configured to absorb pressure exerted by the recreational animal by deforming and partially spreading the exerted pressure perpendicularly outward throughout the stability enhancement component relative to a vertical direction; and a bottom component comprising a direct surface.

13. The method of claim 1, wherein the first stability enhancement component comprises:

a top component comprising a diffuse surface, the diffuse surface comprising a wear-resistant coating configured to withstand deformation; and a bottom component comprising a direct surface.

* * * * *